March 15, 1938.　　　　J. AVINS　　　　2,111,235
MEANS FOR MEASUREMENT OF ELECTRICAL CONSTANTS OF TUNED CIRCUITS
Filed April 16, 1937　　　2 Sheets-Sheet 1
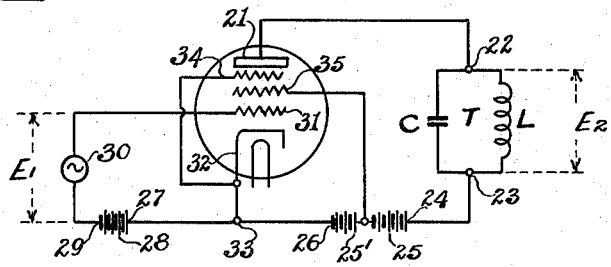
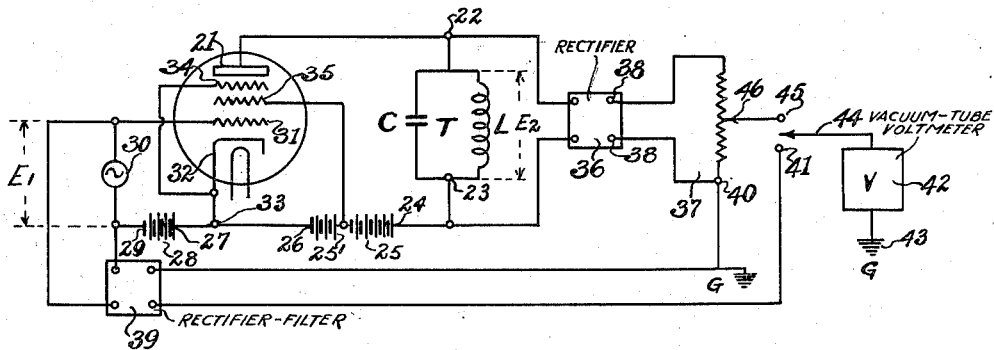
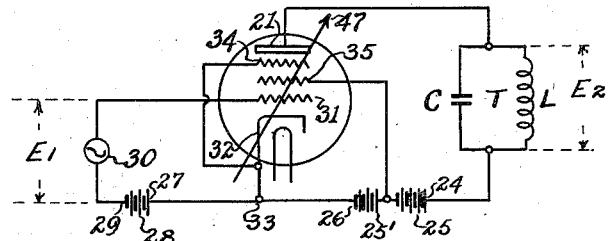
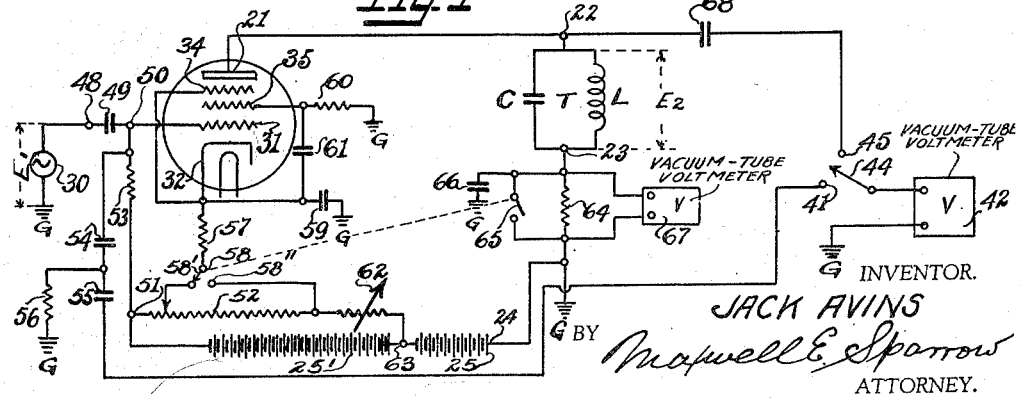
INVENTOR.
JACK AVINS
BY Maxwell E. Sparrow
ATTORNEY.

March 15, 1938. J. AVINS 2,111,235
MEANS FOR MEASUREMENT OF ELECTRICAL CONSTANTS OF TUNED CIRCUITS
Filed April 16, 1937 2 Sheets-Sheet 2
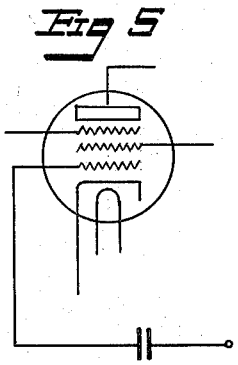
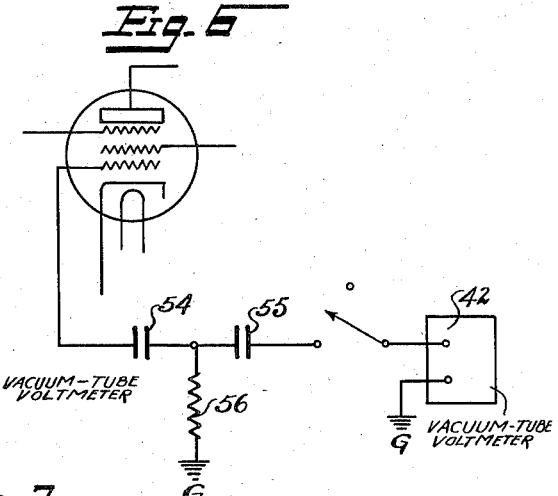
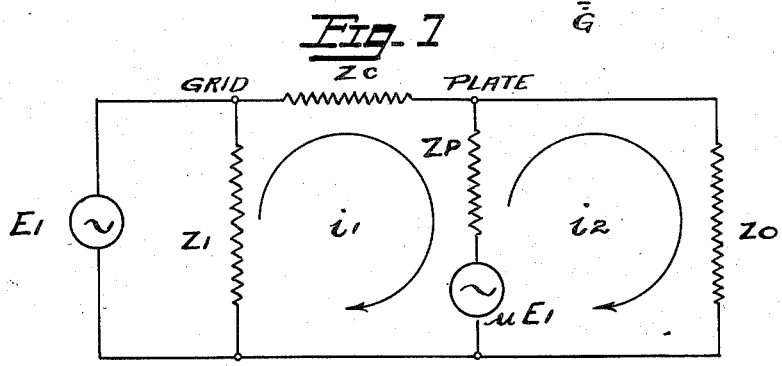
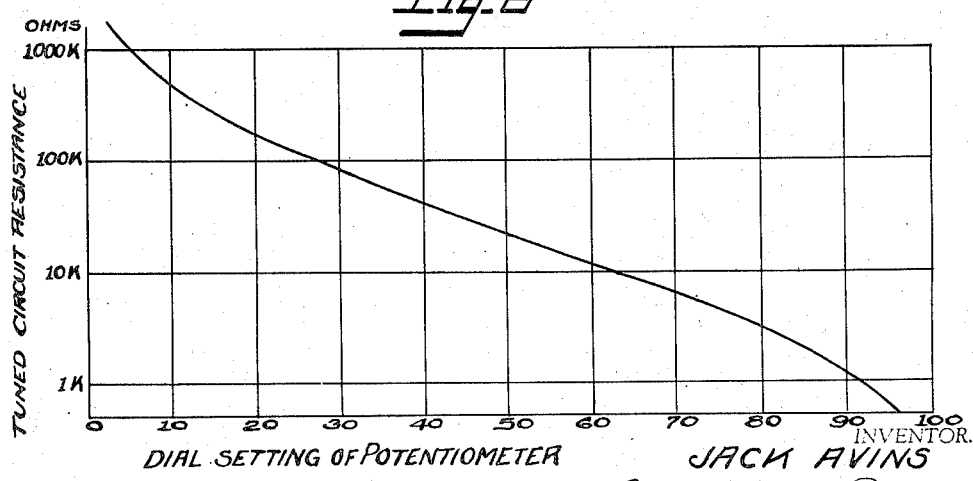
INVENTOR.
JACK AVINS
BY
ATTORNEY.

Patented Mar. 15, 1938

2,111,235

UNITED STATES PATENT OFFICE 2,111,235

MEANS FOR MEASUREMENT OF ELECTRICAL CONSTANTS OF TUNED CIRCUITS

Jack Avins, Staten Island, N. Y., assignor of one-half to John F. Rider, New York, N. Y.

Application April 16, 1937, Serial No. 137,305

11 Claims. (Cl. 175—183)

This invention relates to new and improved methods and means for the measurement of electrical constants and more particularly for the measurement of the parallel-resonant impedance of tuned circuits.

It is the primary object of this invention to provide a new type of instrument which can be utilized for the measurement of the parallel-resonant impedance of tuned circuits.

It is a further object of this invention to disclose methods and means for the measurement of resistance, capacity, inductance, and impedance, as well as related constants such as the figure of merit of capacitors and inductors.

Other objects will become apparent as the description of the invention proceeds.

While there exists a number of different methods for measuring the parallel-resonant impedance of tuned circuits and associated constants, these methods are characterized by limitations well-known to those skilled in the art. This invention discloses new methods for making these measurements over a wide frequency and impedance range, with high accuracy, simplicity, ease and permanence of calibration, and low cost of application.

A general description of the manner in which the invention disclosed herein functions will now be explained in connection with Fig. 1. The tuned circuit under investigation is placed in the plate circuit of a suitably arranged electron discharge tube. A source of preferably alternating voltage $E_1$ of the proper frequency is applied to the grid of the tube, as a result of which a voltage $E_2$ at the same frequency appears across the tuned circuit. Under these conditions, the parallel-resonant impedance R of the tuned circuit becomes a function of the tube and circuit constants, and the signal voltages $E_1$ and $E_2$.

In a preferred embodiment of this invention a considerable degree of simplicity is effected by arranging the circuit so that R becomes solely a function of a single parameter. This parameter, which controls the amplification of the tube, is adjusted until the voltage $E_2$ across the tuned circuit becomes equal to the voltage $E_1$ impressed on the grid. While the value of this parameter which obtains for the balance condition, in combination with the other tube and circuit constants, is sufficient to enable the computation of R, it is more convenient to calibrate the instrument at an audio frequency; this calibration will then hold to a high degree of accuracy over an extremely wide frequency range. A calibration of this type is shown in Fig. 8.

In the preferred embodiment of this invention, the control grid bias of a variable-mu pentode tube is varied to control the amplification, and the calibration is effected in terms of a potentiometer-rheostat setting which controls this bias voltage. A vacuum-tube voltmeter is used to measure $E_1$ and $E_2$; since this functions only to indicate equality in $E_1$ and $E_2$ it does not require to be calibrated. Stability, permanence of calibration, and a high degree of independence of variations in electrode and heater voltages, as well as of variations in tube characteristics, are achieved through a special circuit arrangement which is disclosed further on. It will also be shown that the preferred embodiment of this invention makes possible an appreciable extension of the upper frequency limit at which a low-frequency calibration is valid; this is accomplished through the elimination of error arising from the effects of the grid-to-plate tube capacity.

The invention consists substantially in the construction, combination, location, and relative arrangement of parts and circuits, to be more fully hereinafter set forth, as shown by the accompanying drawings, and finally as pointed out in the appended claims.

Referring to the drawings:

Fig. 1 shows a basic circuit for the measurement of the parallel-resonant impedance of tuned circuits and other electrical constants.

Fig. 2 shows a development of the circuit of Fig. 1.

Fig. 3 shows a basic circuit similar to Fig. 1 but including means for providing variable, controllable amplification.

Fig. 4 shows a preferred embodiment of this invention which functions similarly to the circuit of Fig. 3.

Fig. 5 shows a conventional blocking arrangement.

Fig. 6 shows a special blocking arrangement employed in the preferred embodiment of this invention.

Fig. 7 shows the equivalent network of the circuit of Fig. 1.

Fig. 8 shows a typical calibration curve applying to the preferred embodiment of this invention.

Fig. 1 shows a basic circuit for measuring the parallel-resonant impedance of tuned circuits and other related constants. While a variable-mu pentode tube is indicated, it is understood that any electron discharge tube having suitable characteristics may be employed.

The tuned circuit T under investigation, represented by the condenser C and the inductance L, is placed in the plate circuit of the tube. The plate 21 of the tube is connected to a joint terminal 22 of the condenser C and inductance L, and the other joint terminal 23 is connected to one terminal 24 on the screen and plate battery 25, 25'. The other terminal 26 of the plate and screen battery 25, 25' is connectted to a terminal 27 of the bias battery 28. The other terminal of the bias battery is connected through the frequency generator 30 to the control grid 31. The cathode 32 is tapped at 33 between the battery 25, 25' and 28 and is connected to the suppressor grid 34 of the tube. The screen grid 35 is tapped between the screen and plate battery 25, 25'.

Since the tube functions as an amplifier, a signal voltage $E_1$ applied to the control grid 31 at the resonant frequency of the tuned circuit, produces a voltage $E_2$ at the same frequency across T.

Under the conditions described above, the parallel-resonant impedance R of the tuned circuit becomes a function of the tube constants and the signal voltages $E_1$ and $E_2$. It is thus possible to determine R from the measurement of these constants and the measurement of $E_1$ and $E_2$.

To avoid the necessity for the direct measurement of the tube constants, it is possible to calibrate the instrument at audio frequencies, where tuned circuits with known values of impedance are readily available; this calibration will then hold at radio frequencies to a high degree of accuracy. It is not necessary to measure the absolute values of $E_1$ and $E_2$, since it is the ratio of these two voltages that is significant.

Fig. 2 shows a further development of Fig. 1. As in the previous circuit, a signal voltage $E_1$ at the resonant frequency of the tuned circuit is applied to the tube. The voltage produced across the tuned circuit is passed through a rectifier-filter 36 and a potentiometer-rheostat 37 is placed across the rectifier output 38.

The signal voltage $E_1$ applied to the input of the tube is passed through a rectifier-filter 39 and the latter is connected to the terminals 40 and 41. A vacuum-tube voltmeter 42 is connected between the ground G and the movable index 44, the index 44 being swingable for connection to the contacts 41, and 45 of the potentiometer-rheostat.

In operation the potentiometer-rheostat 37 is adjusted by means of the sliding contact 46 so that the indicator 42 shows no change in deflection when switched from 45 to 41. Under these conditions, R becomes solely a function of the setting of the potentiometer-rheostat and is independent of variation in the signal input $E_1$ over reasonable limits. The calibration of the instrument can be carried out conveniently at audio frequencies.

A certain amount of difficulty may be experienced in designing the rectifier-filter 39 since it is desirable that it possess high stability and be capable of operating for signal inputs of the order of one-half volt. Since the rectifier 36 works at considerably higher voltage inputs, its design is a relatively simple problem.

The circuit disclosed in Fig. 3 is a further development of the circuit shown in Fig. 1. Whereas the tube in Fig. 1 normally operates under fixed gain conditions (as far as the tube parameters are concerned), one or more of the operating voltages of the tube of Fig. 3 are varied so as to provide a controllable amplification. This control can be produced, for example, by a variation of the grid bias, or the screen voltage, or of both. The variable amplification characteristic of the tube is indicated in general terms by the arrow 47 in Fig. 3.

In operation, the gain of the tube is varied until the signal voltage $E_2$ developed across the tuned circuit becomes equal to the signal voltage $E_1$ impressed on the grid. When this condition obtains, then R becomes a function of the parameter which is used to control the gain of the tube, and is independent of the actual value of the voltage $E_1$. It therefore is possible to calibrate the instrument so that R can be read directly as a function of the parameter used to control the gain. It should be observed that neither the signal generator nor the indicator used to compare the voltages $E_1$ and $E_2$ requires to be calibrated.

The preferred embodiment of this invention, which functions basically as explained in connection with Fig. 3, is shown in Fig. 4. In this circuit the signal generator 30 is connected to a terminal 48 of a condenser 49, the other terminal 50 of the condenser being connected to the control grid 31 of the tube. The low potential side of the signal generator is connected to ground at G. A grid resistor 53, which is preferably relatively small in value is connected between 50 and the terminal 51 of a potentiometer-rheostat 52. Between the contacts or terminals connected between 41 and 50 are two blocking condensers 54 and 55. A resistor 56 is connected between the junction of the condensers 54 and 55 and the ground G.

The cathode 32 is connected through a resistor 57 to a terminal 58 of a single pole-double throw switch having a sliding connection 58' with the potentiometer-rheostat 52, the contact 58'' being connected to one end of the potentiometer-rheostat 52. A bypass condenser 59 connects between the ground G and the cathode 32. Interposed between the ground G and the screen grid 35 is a screen resistor 60. A bypass condenser 61 is placed across the respective points between the screen grid and screen resistor on the one hand and the cathode and condenser 59 on the other hand.

The potentiometer-rheostat 52 is connected in series with a rheostat 62, the latter having a connection 63 between the plate and screen batteries 25, 25'. The tuned circuit under investigation is connected between the plate lead of the tube and a resistor 64, the latter being connected to the ground G. Across the resistor 64 is a single pole-single throw switch 65, one terminal of which is connected through a bypass condenser to the ground G. A vacuum-tube voltmeter 67 is connected across the resistor 64. A blocking condenser 68 is interposed between the terminal 45 of the switch 44 and the plate 21 of the tube. The other terminal 41 of the switch 44, as heretofore stated, is connected to the condenser 55. The switches 65 and 58 are preferably ganged, as indicated by the dotted line in Fig. 4.

Consider first the operation of the circuit shown in Fig. 4 with switch 58 thrown to the left and switch 65 closed. The signal $E_1$ is applied to the grid of the tube through the condenser 49, and the grid returned to the cathode 32 through resistor 53. The minimum bias voltage is supplied by the voltage drop across the resistor 57. The condenser 59 bypasses the cathode to ground. The potentiometer-rheostat 52 supplies the variable bias voltage which is used to control the amplification. The battery 25, 25' supplies the cathode, screen, and plate voltages. The condenser 61 bypasses the screen grid, while the screen voltage is supplied through the resistor 60. T is the tuned circuit under investigation, the low potential side of which is bypassed to ground by condenser 66. The signal voltage developed across T is fed to the switch contact 45 through condenser 68. The input signal voltage is fed to the other terminal 41 of switch 44 through the arrangement composed of 54, 55, and 56, which will be hereinafter more fully described.

When the potentiometer-rheostat 52 is correctly adjusted, there will be no change in the reading of the vacuum-tube voltmeter as the switch 44 is thrown from 45 to 41. Under this condition R can be determined from the setting of the potentiometer-rheostat 52 by reference to a calibration curve such as is shown in Fig. 8. For some applications it will be desirable to employ a directly calibrated dial (not shown), possibly in combination with a uniform arbitrary scale, the latter being used for precision work.

A special blocking arrangement is preferably employed to prevent even a small fraction of the difference in direct-current potential between the grid and plate circuits from affecting the vacuum-tube voltmeter 42. If a conventional blocking arrangement is used, such as that shown in Fig. 5, then because of the high input resistance of 42—of the order of 10 megohms—an appreciable voltage will be impressed on 42 through the leakage resistance of the blocking condenser. The circuit in Fig. 6 effects a successive reduction in this leakage voltage since the resistance of 56 can be made very small in comparison with the leakage resistance of 54. The blocking condenser 55 effects a further reduction in the leakage voltage.

The effect of a variation in tube characteristics and in the electrode voltages upon the accuracy and permanence of the calibration makes it desirable to have some means for establishing a total value of voltage across the potentiometer-rheostat 52 which is related directly to an arbitrarily established minimum value of mutual conductance which exists when this total value of bias voltage is impressed on the grid. This presents somewhat of a problem in that the mutual conductance changes rapidly in the cutoff region. It so happens, however, that the plate or cathode current also varies very rapidly in this region, and so—while it is not convenient to measure the mutual conductance of the tube directly—the mutual conductance can be set to some value which is decided upon as the standard value, by setting the plate current to a corresponding fixed reference value. Since this plate current is rather small in value, its direct measurement would require the use of a sensitive microammeter. To avoid the necessity for the latter instrument, a large value of resistance 64 is inserted either in the plate or cathode circuit, and the voltage drop across 64 due to the plate or cathode current is measured by an indicator, such as, for example, a simple vacuum-tube voltmeter 67.

Consider the circuit in Fig. 4 when switch 58 is thrown to the right and switch 65 is open. Under this condition the full value of bias voltage across 52 is placed on the cathode, and the plate current flowing through 64 causes a voltage drop across it.

To standardize the instrument so that the calibration will be effective and to a large degree be independent of changes in tube characteristics and operating voltages, the rheostat 62 is adjusted so that 67 indicates the standard value of plate current for which the instrument was calibrated. With the instrument thus standardized, the switches 58 and 65 are thrown to the opposite sides, and the instrument is ready for use.

The arrangement for measuring the plate current can be placed directly in the cathode circuit if it is so desired; this makes it possible to ground the low-potential side of T. In this case it is the cathode current rather than the plate current which is measured.

The necessity for this special arrangement (58, 62, 64, 65, 66, 67) to standardize the instrument will be clearer from the following considerations. In the cutoff region, a variation of a fraction of a volt in the voltage across the potentiometer-rheostat 52 will cause a serious error in the measurement of R since the mutual conductance of the vacuum tube varies very rapidly. Thus, if the calibration were effected in terms of the total bias voltage applied to the cathode, then a given percentage error in the bias voltage would in some cases cause a considerably greater error in the measurement of R. The method of standardization shown here avoids this error by making it possible to adjust the total bias voltage to an extremely high order of accuracy. The accuracy of this adjustment can be checked at any time by throwing the switch 58 to the right and opening switch 65.

It should be noted that if a voltmeter arrangement were used to specify R directly as a function of the bias voltage, as measured by a voltmeter, then this compensating action would not be obtained.

At the higher radio frequencies, the capacity between the grid and the plate introduces a certain amount of error in the circuit of Figs. 1 and 2, where the amplification is in general different from unity. However, the circuit of Figs. 3 and 4 removes this source of error as will now be shown.

Applying Kirchhoff's law to the equivalent network in Fig. 7, the following equations are obtained:

(1) $$E_1 = i_1 Z_c + i_2 Z_o$$

(2) $$-\mu E_1 = (i_2 - i_1) Z_p + i_2 Z_o$$

From (1) and (2)

(3) $$Z_o i_2 = \frac{(Z_p - \mu Z_c) Z_o E_1}{Z_o Z_p + (Z_o + Z_p) Z_c}$$

It follows that the amplification (4) $$A = \frac{Z_o i_2}{E_1} = \frac{(Z_p - \mu Z_c) Z_o}{Z_o Z_p + (Z_o + Z_p) Z_c}$$

At the higher radio frequencies where $Z_c$ is small enough to be of importance, the following relations obtain in the cases that are of principal interest:

$$Z_o = R$$

$$Z_p = r_p$$

$$Z_c = \frac{-j}{\omega c}, \text{ c grid-to-plate capacity}$$

$$Z_o \ll Z_p$$

$$|A| = 1$$

Substituting in (4)

(5) $$|A| = 1 = \left| \frac{\left(r_p + \frac{j\mu}{\omega c}\right) R}{r_p \left(R - \frac{j}{\omega c}\right)} \right|$$

From (5)

(6) $$\frac{\mu^2 R^2}{\omega^2 c^2} = \frac{r_p^2}{\omega^2 c^2}, \text{ or } R = \frac{1}{g_m}$$

It therefore follows that the balance condition is independent of the grid-to-plate capacity, and that a calibration made at a lower frequency can be used at higher radio frequencies where the grid-to-plate capacity would ordinarily introduce an appreciable error.

Fig. 8 shows a typical calibration curve which applies to an instrument constructed in accordance with the preferred embodiment of this invention. It will be noted that a range of tuned-circuit impedances from below 1000 ohms above 1 megohm is covered. While this range is sufficient for all ordinary measurements, the lower limit can be extended by combining two or more tubes in parallel, or by using a tube with a higher value of mutual conductance.

It may further be noted that the frequency and impedance range covered by this instrument is greater than that covered by the widely-used resistance-neutralization method.

To avoid coupling between the grid and plate circuits of the tube, the switch 44 should be of a special anti-capacity design. Careful attention should also be given to the proper placement and relative disposition of the several components so as to avoid stray coupling.

At the ultra-high radio frequencies an error in the low-frequency calibration will be introduced as a result of changes in the coupling and transfer admittances of the tube, and increases in the tube losses. However, the instrument can be used in this range provided a new calibration is made at these frequencies. The frequency-variation method is one of the most convenient ways of making this calibration.

While the circuits described in connection with the figures have dealt specifically with methods and means for measuring the parallel-resonant impedance of tuned circuits, it is to be understood that since a tuned circuit is composed of the three basic electrical circuit constants, resistance, capacity, and inductance, these fundamental constants as well as combinations thereof can be readily measured by associating them with a conveniently chosen tuned circuit.

While there are many ways of effecting a calibration of the instrument at audio frequencies, one of the most convenient is the following: The characteristics of a low-loss tuned circuit, which is especially chosen for the high value of parallel-resonant impedance which it possesses, are first determined. A convenient method for measuring the characteristics of this tuned circuit is to arrange it in the series form and to place it in one of the arms of a Wheatstone bridge. Since this measurement is carried out at audio frequencies, there is no special difficulty involved in the measurement.

Having determined the parallel-resonant impedance of the tuned circuit, it is possible to obtain any desired value of load resistance by the expedient of shunting the tuned circuit with the appropriate value of resistance. For example, if the tuned circuit impedance is 2 megohms, and it is desired to obtain a calibration point at 1 megohm, then it is required to shunt the tuned circuit with a 2-megohm resistor. In this way any value of tuned-circuit impedance can be obtained, from the value with no shunt resistance down to the lowest desired value. The calibration is effected by noting the dial reading of the potentiometer-rheostat 42 which obtains for a given value of load impedance when the balance condition is attained.

While batteries have been indicated in the figures as the source of voltage, it is understood that other electrical sources, such as a conventional alternating-current power supply, may be used to supply the various voltages which are required.

While a vacuum-tube voltmeter has been used to determine the equality of $E_1$ and $E_2$, as well as for the measurement of the plate current, it is understood that any other suitable indicator may be used for the same purpose.

It is possible to use the circuit indicated in Fig. 1 in conjunction with the frequency-variation or the capacity-variation methods. In this case the function of the tube is simply to impress a radio-frequency voltage across the tuned circuit. It is further possible to calibrate an instrument of the type described in connection with Fig. 4 through the use of these methods, although, as a general rule, it is more convenient to carry out the calibration at audio frequencies using the aforementioned method.

For some applications it may be desirable to place the amplifier and indicator tubes in a separate radio-frequency section or probing head so as to permit short radio-frequency leads to the tuned circuit under investigation. Such parts and additional equipment which do not carry radio-frequency currents and which are required to complete the instrument can be put in a separate direct current section or unit which is connected to the probing unit by a cable of convenient length.

The use of a screen grid tube having a high plate resistance is desirable in order to minimize the damping effect on the tuned circuit being investigated. Since the plate resistance of a screen grid tube increases for increasing values of grid bias, it follows that the plate resistance which obtains for a given balance condition is larger the larger the value of tuned-circuit impedance being measured and hence that the damping effect is kept to a minimum.

It is understood that wherever the term "electrical constant or constants of a tuned circuit" appears in the specification and the claims, that term is to be construed as including any electrical constant or constants which may form part of a tuned circuit or which can be associated with a tuned circuit for the purpose of measurement.

It is believed from the above description that those skilled in the art will have no difficulty in understanding the construction, the method of use, and the operation of the device herein disclosed and that a further detailed discussion thereof is unnecessary. The invention is of simple and practical construction and is adapted to accomplish, among others, all of the objects and advantages herein set forth.

The term "exhibiting" is used in the claims to include indicating, registering, calibrating, or other direct or indirect manner of determination.

While I have indicated a preferred embodiment of my invention, many modifications may be made without departing from the spirit of this invention, and I do not wish to be limited to the precise details of construction set forth, but desire to avail myself of all changes within the scope of the appended claims.

I claim:

1. A method of measuring electrical constants of a tuned circuit which includes placing the said tuned circuit in the plate circuit of an electron discharge tube, impressing an alternating voltage upon a grid of the tube, and adjusting the parameter of the tube controlling the amplification until the voltage across the tuned circuit becomes equal to the voltage impressed on the grid.

2. A measuring device comprising an electron tube having a plate, a tuned circuit connected with the plate, and means for exhibiting the electrical constants of the tuned circuit as a function of the mutual conductance of the tube.

3. A device for measuring electrical constants of a tuned circuit, comprising an electron discharge tube including cathode, grid, and plate elements, means for connecting said tube to an electrical source of power, means for connecting the tuned circuit in the plate circuit of said tube, means for impressing an alternating voltage on a grid of said tube, and means for exhibiting said electrical constants as a function of the mutual conductance of the tube.

4. A device for measuring electrical constants of a tuned circuit, comprising an electron discharge tube including cathode, grid, and plate elements, means for connecting said tube to an electrical source of power, means for introducing the tuned circuit into the plate circuit of said tube, means for impressing an alternating voltage on a grid of said tube, means for varying the amplification of said tube, and means for exhibiting said electrical constants as a function of the mutual conductance of the tube.

5. A device for measuring electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for varying the amplification of said tube, and means for measuring said amplification.

6. A device for measuring electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for varying the amplification of said tube, means for indicating said amplification, and an indicator for balancing the alternating grid voltage against the voltage across the tuned circuit.

7. A device for measuring electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, and means for exhibiting said electrical constants including means for rectifying and filtering the alternating grid voltage, and means for rectifying and filtering the voltage across the tuned circuit.

8. A device for measuring electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for rectifying and filtering the alternating grid voltage, means for rectifying and filtering the voltage across the tuned circuit, and an indicator for comparing the said voltages after they have been rectified and filtered.

9. A device for measuring electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for varying the gain of said tube, and means for comparing the impressed grid voltage with the alternating voltage across the tuned circuit.

10. A device for measuring the electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for comparing the impressed grid voltage with the alternating voltage across the tuned circuit, a potentiometer-rheostat for varying the bias of the tube, and means for establishing a total value of grid voltage across said potentiometer-rheostat such as to provide a minimum value of mutual conductance to standardize the device.

11. A device for measuring the electrical constants of a tuned circuit, comprising an electron discharge tube including cathode, grid and plate elements, means for connecting said tube to an electrical source of power, means for introducing the tuned circuit into the plate circuit of said tube, means for impressing an alternating voltage on a grid of said tube, means for comparing the impressed grid voltage with the alternating voltage across the tuned circuit, a potentiometer-rheostat for varying the bias of the tube, means for establishing a total value of grid voltage across said potentiometer-rheostat such as to provide a minimum value of mutual conductance to standardize the device, and means for preventing direct-current voltage from affecting the indicator used for comparing the impressed grid voltage with the voltage developed across the tuned circuit.

JACK AVINS.